US008110730B2

(12) United States Patent
Burdick

(10) Patent No.: US 8,110,730 B2
(45) Date of Patent: Feb. 7, 2012

(54) KEYLESS DRUM TUNING DEVICE

(76) Inventor: Charles I. Burdick, Saugerties, NY (US)

( * ) Notice: Subject to any disclaimer, the term of this patent is extended or adjusted under 35 U.S.C. 154(b) by 40 days.

(21) Appl. No.: 12/803,475

(22) Filed: Jun. 28, 2010

(65) Prior Publication Data

US 2011/0314993 A1 Dec. 29, 2011

(51) Int. Cl.
*G01D 13/02* (2006.01)

(52) U.S. Cl. .................................................... 84/411 R

(58) Field of Classification Search ................ 84/312 R, 84/411 R, 421
See application file for complete search history.

(56) References Cited

U.S. PATENT DOCUMENTS 775,711 A 11/1904 Turney
1,090,426 A 3/1914 Thomas
1,293,599 A 2/1919 Wilson
1,995,066 A 3/1935 Hiers
2,172,578 A 9/1939 Gladstone
2,173,443 A 9/1939 Schuman
4,154,136 A 5/1979 McIntyre
5,097,736 A 3/1992 Turner
5,442,988 A 8/1995 Mayo
6,242,680 B1 * 6/2001 Benton, Jr. .................. 84/411 R
6,365,811 B1 4/2002 Conta
6,459,026 B1 10/2002 Bozzio
7,351,899 B2 4/2008 Kennedy
2008/0141846 A1 6/2008 ver der Mulen

* cited by examiner

*Primary Examiner* — Kimberly Lockett

(57) ABSTRACT

A keyless drum tuning device includes a lug bracket attached to a shell of the musical drum. The keyless tuning device has a tensioning fastener that is removably connected to a tensioning counter-hoop or rim of the musical drum and passes through an opening in the lug bracket. The keyless drum tuning device includes an adjustment mechanism that is affixed to the tensioning fastener. The adjustment mechanism is contacts the lug bracket and is varied to modify the tension in the tension fastener.

28 Claims, 5 Drawing Sheets

KEYLESS DRUM TUNING DEVICE

BACKGROUND OF THE INVENTION

1. Field of the Invention

This invention relates generally to devices for tuning musical instruments. More particular, this invention relates to devices for tuning a musical drum. Even more particularly, this invention relates a mechanism for keyless tuning or tensioning drum heads of musical drums to modify the sound of the drum.

2. Description of Related Art

Musical drums typically comprise a hollow cylindrical drum shell with a vibratory membrane or drum head stretched tightly over one end or both ends to define a resonant cavity within the shell. When a drum head is struck, it vibrates with a particular resonance, and this vibration is transmitted to the air within and outside of the cavity, as well as through the shell. The sum of these vibrations is perceived as the sounds produced by the drum.

Each of the drum heads has a larger diameter than the shell so that it may overlap the outer periphery of the shell and be secured against the periphery by a counter-hoop or rim that fits tightly over the end of the shell. Typically, the rims are bolted, or secured to a bracket that is affixed to the shell, or similarly fastened to the shell. The bolting or bracketing mechanisms typically require a key or wrench device that is used to tighten the rim to the shell so as to tension the drum head such as described in U.S. Pat. No. 2,172,578 (Gladstone), U.S. Patent Publication 2002/0046637 (Meinl), and U.S. Pat. No. 4,619,179 (Wright).

With the passage of time and as a drum is played, the tension of the drum heads on the shell may decrease due to stretching of the drum heads or loosening of tensioning devices that are attached to the shell. This change in tension will affect the sound produced, and will make it necessary to adjust the tension of the drum head to "tune" the drum to obtain the desired degree of tension, and consequently, the desired sound which the drum can produce.

Various keyless tuning mechanisms have been devised such as U.S. Pat. No. 775,711 (Turney), U.S. Pat. No. 1,995,066 (Hiers), U.S. Pat. No. 2,173,443 (Schuman), U.S. Pat. No. 5,450,988 (Mayo), and U.S. Pat. No. 5,997,463 (Bartlett). Each of these provide a complex mechanism that has many interlocking parts. Some of these parts are springs, inserts, and gears that will rattle and buzz when the drum head is struck causing corruption of the tonal quality of the drum.

SUMMARY OF THE INVENTION

An object of this invention is to provide a device for single handed keyless tuning of musical drum.

Further, another object of this invention is to provide a device for stationary in situ tuning of a drum in its operating stand or position.

Still another object of this invention is to provide a device for tuning a musical drum while preventing extraneous noise from inserts or springs.

Still further, another object of this invention is to provide a tuning device for a musical drum that allows ease of assembly and disassembly of the head from a musical drum.

To accomplish as least one of these objects, a keyless drum tuning device includes a lug bracket attached to a shell of the musical drum. The keyless tuning device has a tensioning fastener that is removably connected to a tensioning counter-hoop or rim of the musical drum and passes through an opening in the lug bracket. The keyless drum tuning device includes an adjustment mechanism that is affixed to the tensioning fastener. The adjustment mechanism is in contact with the lug bracket and is varied to modify the tension in the tension fastener.

In some embodiments, the lug bracket has an opening to accept a connecting fastener that joins the lug bracket to the musical drum shell. In some of these embodiments, the opening in the lug bracket is threaded to accept a threaded fastener having pan shaped head to secure the lug bracket to the drum shell. In some embodiments, the connecting fastener has a washer between its pan shaped head and the drum shell and the washer is sufficiently sound absorbent to acoustically cushion the drum shell from the lug bracket. In most embodiments, the connecting fastener is a metal fastener such as brass, stainless steel, or chromium plated steel. In various embodiments, the lug bracket has a connecting fastener formed within the lug bracket to be placed in an opening within the drum shell and secured to the drum shell with a fastening device to secure the lug bracket to the drum shell. In other embodiments where the drum shell is an acrylic plastic, the lug bracket is affixed to the drum shell with an adhesive. In still other embodiments where the drum shill is a metal such as brass or steel, the lug bracket is affixed with a brazed or welded bond.

In other embodiments, the tensioning fastener is a bolt having a locking head structure to secure the tensioning fastener to the tensioning counter-hoop of the musical drum. In alternative embodiments the tensioning fastener is a threaded rod having a locking mechanism to secure the tensioning fastener to the tensioning counter-hoop. In still other embodiments, the tensioning fastener is a metal, for instance brass, stainless steel, or chromium plated steel.

In some embodiments, the adjustment mechanism is a knurled knob having fine thread to provide a fine adjustment of the tension of the head of the musical drum. In various embodiments, the adjustment mechanism has multiple detents that are seated into indentations of a bottom surface of the lug bracket to maintain the tension in the head of the musical drum to prevent the adjustment mechanism from being reversed and relaxing the tension in the head of the musical drum.

In various embodiments the tensioning fastener is a fiber reinforced plastic where the fiber is carbon fiber. In some embodiments where the tensioning fastener is a fiber reinforced plastic, the adjustment mechanism is a fiber reinforced plastic where the fiber is carbon fiber.

In other embodiments a musical drum has at least one vibratory membranous head. The at least one membranous head is secured to a drum shell of the musical drum with a tensioning counter-hoop that fits over a bearing edge of the drum shell. Where the tensioning counter-hoop forces the membranous head to stretch to tune the drum.

The musical drum includes a plurality of keyless drum tuning devices. Each of the keyless drum tuning devices includes a lug brackets attached to a shell of the musical drum. The keyless tuning device has a tensioning fastener that is removably connected to a tensioning counter-hoop of the musical drum and passes through an opening between a top surface and a bottom surface of the lug bracket. The keyless drum tuning device includes an adjustment mechanism that is affixed to the tensioning fastener. The adjustment mechanism is adjusted to contact the bottom surface of the lug bracket to modify the tension in the tension fastener.

In some embodiments, the lug bracket has an opening to accept a connecting fastener that joins the lug bracket to the musical drum shell. In some of these embodiments, the opening in the lug bracket is threaded to accept a threaded fastener having pan shaped head to secure the lug bracket to the drum shell. In some embodiments, the connecting fastener has a washer between its pan shaped head and the drum shell and the washer is sufficiently sound absorbent to acoustically cushion the drum shell from the lug bracket. In most embodiments, the connecting fastener is a metal fastener such as brass, stainless steel, or chromium plated steel. In various embodiments, the lug bracket has a connecting fastener formed within the lug bracket to be placed in an opening within the drum shell and secured to the drum shell with a fastening device to secure the lug bracket to the drum shell. In other embodiments where the drum shell is an acrylic plastic, the lug bracket is affixed to the drum shell with an adhesive. In still other embodiments where the drum shill is a metal such as brass or steel, the lug bracket is affixed with a brazed or welded bond.

In other embodiments, the tensioning fastener is a carriage bolt having a locking head structure to secure the tensioning fastener to the tensioning counter-hoop of the musical drum. In alternative embodiments the tensioning fastener is a threaded rod having a locking mechanism to secure the tensioning fastener to the tensioning counter-hoop. In still other embodiments, the tensioning fastener is a metal including brass, stainless steel, or chromium plated steel.

In some embodiments, the adjustment mechanism is a knurled knob having fine thread to provide a fine adjustment of the tension of the head of the musical drum. In various embodiments, the adjustment mechanism has multiple detents that are seated into indentations of a bottom surface of the lug bracket maintain the tension in the head of the musical drum to prevent the adjustment mechanism from being reversed and relaxing the tension in the head of the musical drum.

In various embodiments the tensioning fastener is a fiber reinforced plastic where the fiber is carbon fiber. In some embodiments where the tensioning fastener is is a fiber reinforced plastic, the adjustment mechanism is a fiber reinforced plastic where the fiber is carbon fiber.

DETAILED DESCRIPTION OF THE INVENTION

The embodiments of a musical drum have multiple keyless drum tuning devices. Each of the keyless drum tuning devices includes a self-locking lug bracket that is secured to the hollow cylindrical shell of the musical drum. A tensioning mechanism is linked to a counter-hoop or rim of the musical drum and connected to the lug bracket. A fine adjustment device is attached to the tensioning mechanism and placed to be in contact with the lug bracket. The fine adjustment device is repositioned with respect to the tensioning mechanism to move the counter-hoop to increase the tension of the membranous head. In some embodiments, the lug is a cast or machined metal fastener having an opening to receive the tensioning mechanism. In certain embodiments, the tensioning mechanism is a threaded rod or bolt having fine threads and a locking feature. The locking feature secures the tensioning mechanism to the counter-hoop. The fine adjustment device in specific embodiments is a knurled knob that is threaded on the threads of the rod and adjusted to be in contact with a bearing surface of the lug bracket such that, when adjusted, the knurled knob increased tension in the tensioning mechanism to force the counter-hoop to stretch the membranous head to tune the drum to raise or lower the tonal pitch or the drum.

Figure 1B:
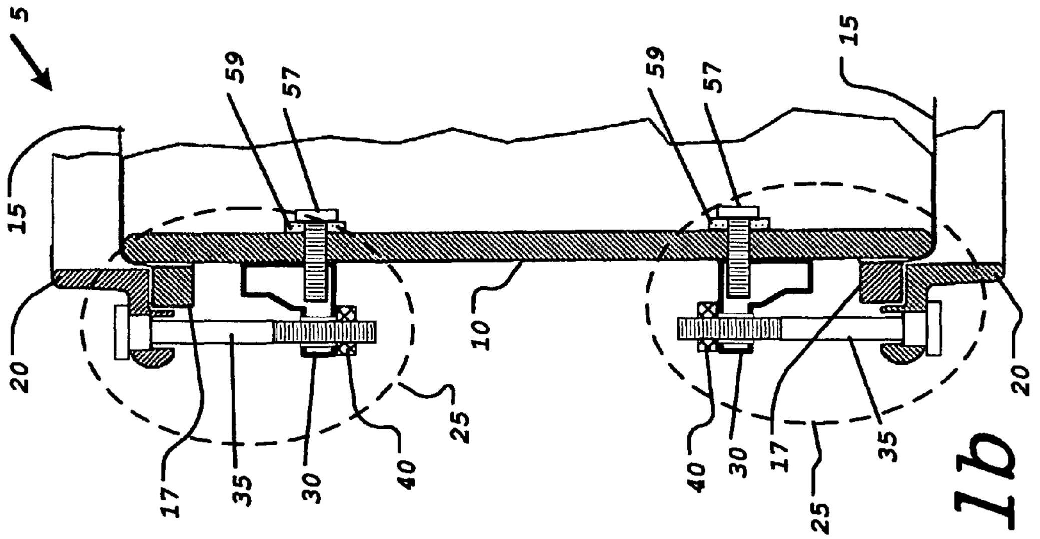
FIG. 1*b* is a cross sectional diagram of an embodiment of a musical drum showing keyless drum tuning devices.
Figure 1A:
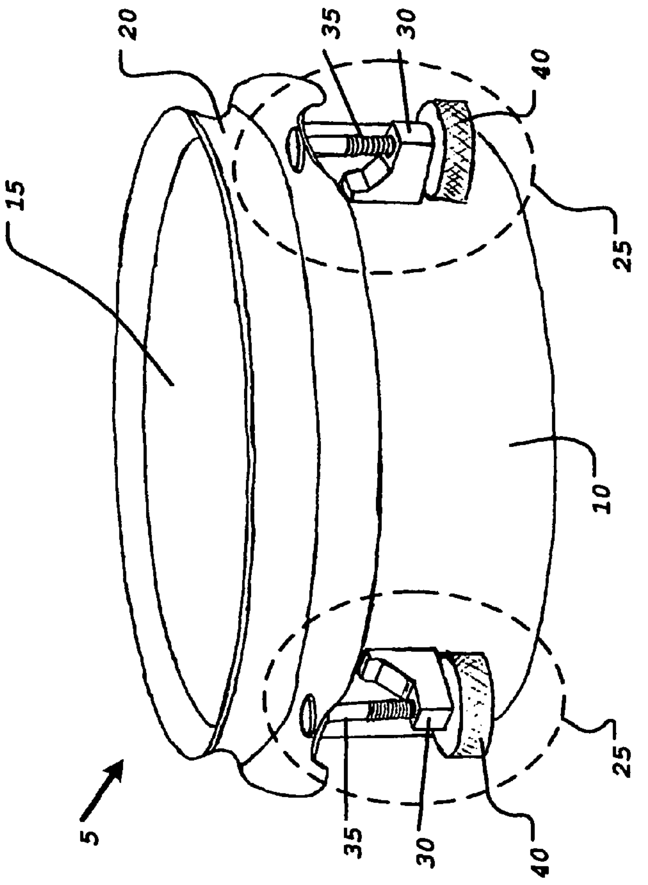
FIG. 1*a* is an illustration of an embodiment of a musical drum showing keyless drum tuning devices.
Figure 2C:
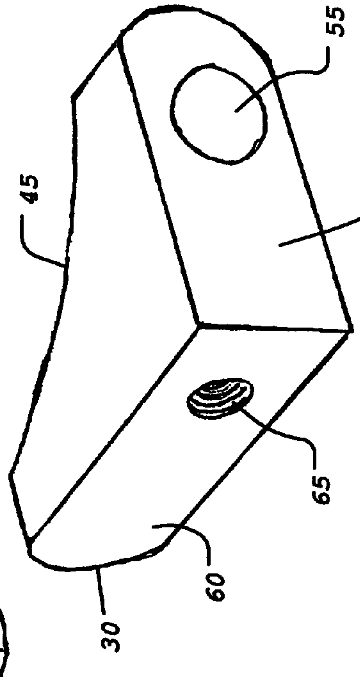
FIGS. 2*a*-2*d* are perspective drawings of lug brackets of embodiments of keyless drum tuning devices.
Figure 2B:
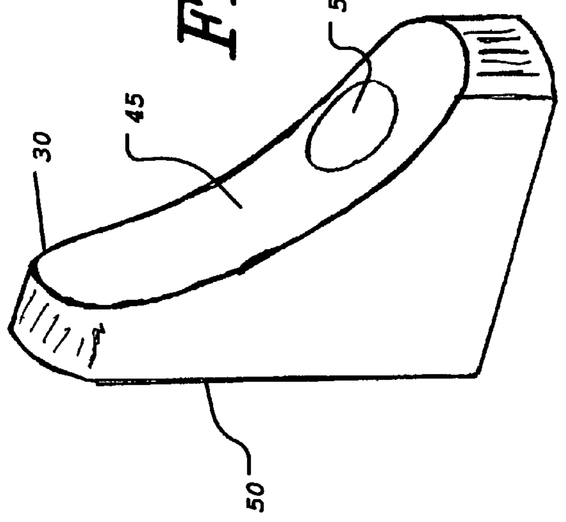
Figure 2A:
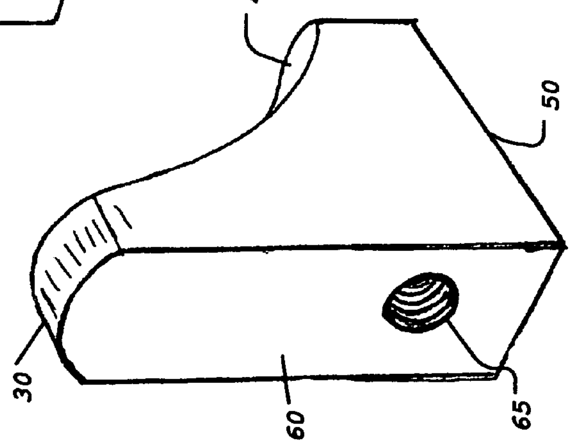

FIG. 1*a* is an illustration of an embodiment of a musical drum showing keyless drum tuning devices. FIG. 1*b* is a cross sectional diagram of an embodiment of a musical drum showing keyless drum tuning devices. The musical drum 5 has a hollow cylindrical body shell 10 or frame that is generally formed of wood or metal. In some embodiments, the body shell 10 may be a fiber reinforced plastic. A membranous head 15 is a covering constructed of a plastic membrane (i.e. mylar), an animal skin, or the like. A head hoop or flesh hoop 17 is attached to the periphery of the membranous head 15. The membranous head 15 with its head hoop 17 is placed over one or both of the end openings of the body shell 10. A counter-hoop 20 attached to the periphery of the membranous head 15 in contact with the head hoop 17. The membranous head 15 is stretched to be tightened or tensioned by adjusting the tensioning fastener 35 such that when struck the drum provides a resonant sound.

Multiple keyless drum tuning devices 25 are secured to the body shell 10 and connected to the counter-hoop 20. When the multiple keyless drum tuning devices 25 are adjusted, the counter-hoop 20 is moved is such a way the membranous head 15 is appropriately stretched to tune the membranous head to produce the desired sound. Each of the multiple keyless drum tuning devices 25 is adjusted separately to produce a more uniform sound over the surface of the membranous head 15.

The multiple keyless drum tuning devices 25 each have a lug bracket 30 that is attached to the body shell 10. FIGS. 2*a*-2*d* are perspective drawings of lug brackets 30 of embodiments of keyless drum tuning devices. In the embodiments as shown, the lug bracket 30 is a block that has an opening 55 that is formed from a bottom surface 50 to a top surface 45 to receive the tensioning fastener 35. The top surface 45 in some embodiments is angled (shown in FIGS. 1*a* and 1*b* or curved as shown herein. In other embodiments, the bottom surface 50 and the top surface 45 are parallel. The lug bracket 30 has a back surface 50 into which a threaded opening 65 is placed to receive a fastener 57 of FIG. 1*b*. The fastener 57 is, in some embodiments, a fine threaded pan headed screw and may have a washer 59 to provide a secure connection of the lug bracket 30 to the body shell 10 while providing sound insulation of the fastener 57 from the body shell 10. Alternately, in other embodiments, the lug bracket may have a connecting fastener integrated into the back surface 50 (not shown). The integrated connecting fastener is passed through an opening in the body shell 10 and is secured by a fastening device such as a nut to secure the lug bracket 30 to the body shell 10. In other embodiments where the drum shell is an acrylic plastic, the lug bracket is affixed to the drum shell with an adhesive (not shown). In still other embodiments where the drum shill is a metal such as brass or steel, the lug bracket is affixed with a brazed or welded bond (not shown).

The tensioning fastener 35 passes through the counter-hoop 20 and thence through the opening 55 of the lug bracket 30. The tensioning fastener 35 is secured to the lug bracket with the adjustment device 40. In some embodiments, the bottom surface 50 of the lug bracket 30 has a notch 70 or a bulge or lump to provide an increase in the retaining friction for the knurled knob 40. Increasing the retaining friction of the knurled knob 40 inhibits the backing off or reversing the knurled knob's 40 position on the tensioning fastener 35.

Figure 3A:
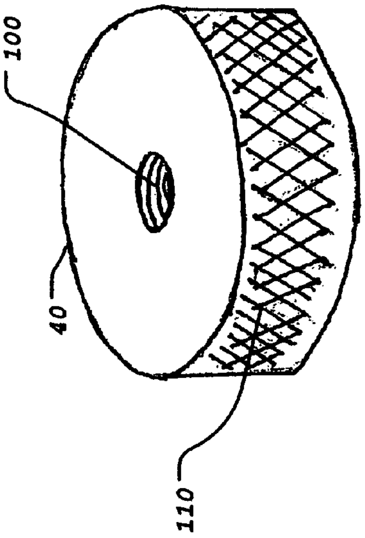
FIGS. 3*a* and 3*b* are perspective drawings of the adjustment mechanism of various embodiments of the keyless drum tuning device.
Figure 3B:
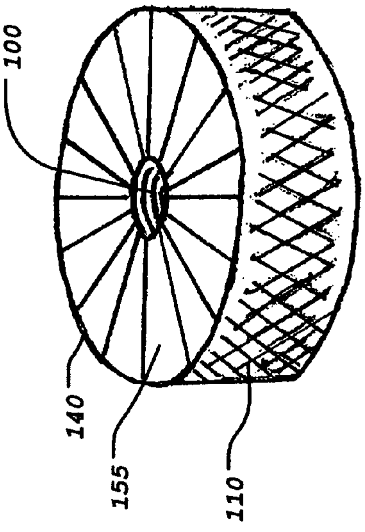

FIGS. 3*a* and 3*b* are perspective drawings of the adjustment device 40 of various embodiments of the keyless drum tuning device. The adjustment device 40 is a cylindrical knob that has a threaded opening 100 that will accept the tensioning mechanism 35 of FIGS. 1*a* and 1*b*. The cylindrical knob of the adjustment device 40 has is knurled grooves 110 or ridges. In still other embodiments, the cylindrical knob may have fluting on its side to provide a gripping surface for hand adjustment of the tension of the membranous head 15.

Figure 2D:
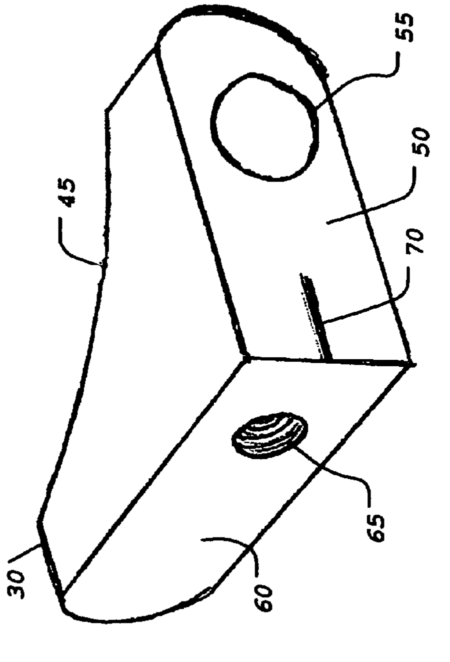

Referring to FIGS. 2*d* and 3*b*, in some embodiments, the lug bracket 30 has at least one ridge 70 that mates with the grooves 115 impressed into the surface of the adjustment device 140. As the adjustment device 140 is turned the ridge 70 of the lug bracket 30 slides over the top surface 155 to mate with the grooves 115. The ridge 70 and the grooves 115 act as stops that prevent detuning of the drum during use. The tension of the membranous head 15 acts as a spring force that forces the ridge 70 into one of the grooves 115 to increase the friction and provide a positive feedback sensation during the tuning of the drum.

Figure 4:
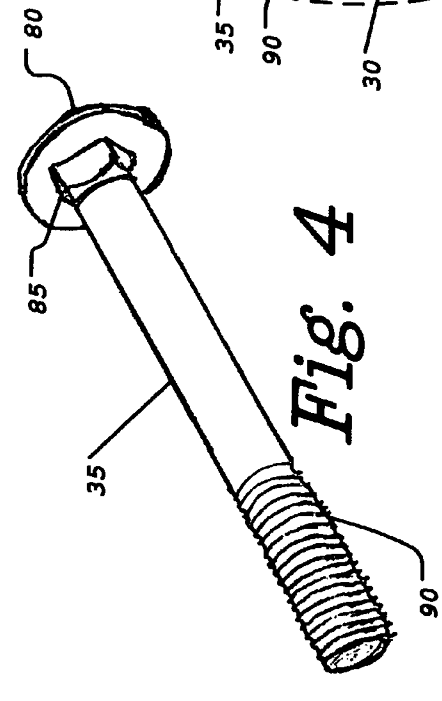
FIG. 4 is a perspective drawing of a tensioning fastener of various embodiments of the keyless drum tuning device.

FIG. 4 is a perspective drawing of a tensioning fastener 35 of various embodiments of the keyless drum tuning device. The tensioning fastener 35 is linked to the counter-hoop 20 of FIGS. 1*a* and 1*b*. of the musical drum 5 and is connected to the lug bracket 30. The adjustment device 40 is attached to tensioning fastener 35 and placed to be in contact with the lug bracket 30. The tensioning fastener is a metal rod and has a fine threaded region 90 that mates with the fine threads of the threaded opening 100 of the adjustment device 40. In some embodiments, the fine threaded region 90 has a machine thread type of from approximately 20 threads per inch to approximately 40 threads per inch. The larger number of threads per linear inch of the fine threaded region 90 implies a finer adjustment in the tuning of the musical drum 5. In various embodiments, the metal rod may be brass, stainless steel, or chromium plated steel. In various embodiments the tensioning fastener 35 is a fiber reinforced plastic where the fiber is carbon fiber. In some embodiments where the tensioning fastener 35 is a fiber reinforced plastic, the adjustment mechanism 40 is a fiber reinforced plastic where the fiber is carbon fiber.

Figure 6B:
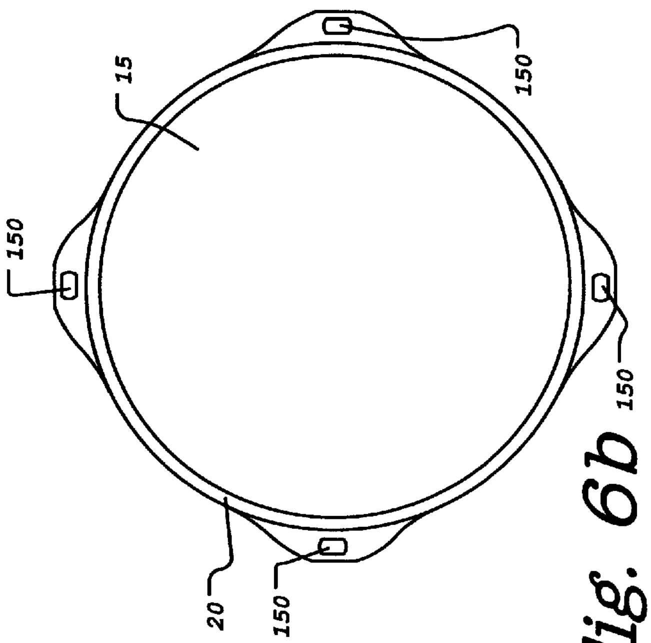
FIGS. 6*a* and 6*b* are drawings of the tensioning hoop keyless tuning device illustrating locking features to secure the keyless tuning device to the counter-hoop for tuning the musical drum.
Figure 6A:
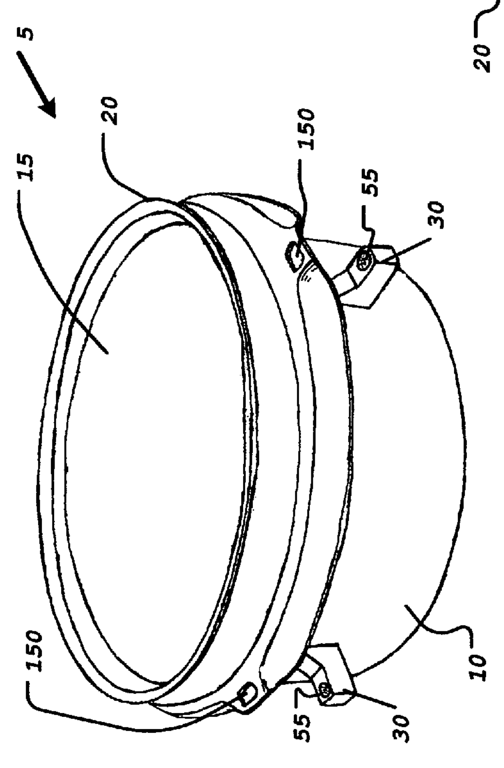

The tensioning fastener 35 has a head 80 that is sufficiently large to secure the tensioning fastener 35 to the counter-hoop 20. The head 80 may be a rounded head or flattened pan head and generally has no slot or philips drive region. FIGS. 6*a* and 6*b* are drawings of the musical drum 5 illustrating locking features 150 to secure the keyless tuning device 25 of FIGS. 1*a* and 1*b* to the counter-hoop 20 for tuning the musical drum 5. FIG. 6*a* shows a perspective view of the musical drum 5 without the adjustment device 40 of FIG. 3*a* or 3*b* and the tensioning fastener 35 of FIG. 4 in place. Referring to FIGS. 4, 6*a*, and 6*b*, the locking features 150 are openings in the counter hoop that are sufficiently large to allow the tensioning fastener 35 to pass through the opening. The tensioning fastener 35 has a locking element 85 formed under the head 80. The locking feature 150 is sufficiently large to allow the locking element 85 of the tensioning fastener 35 to pass through counter hoop 20. In the embodiment as shown, the locking element 85 is a square neck that prevents the tensioning fastener 35 from rotating. In some embodiments, the tensioning fastener 35 is commonly termed to be a carriage bolt.

Figure 5:
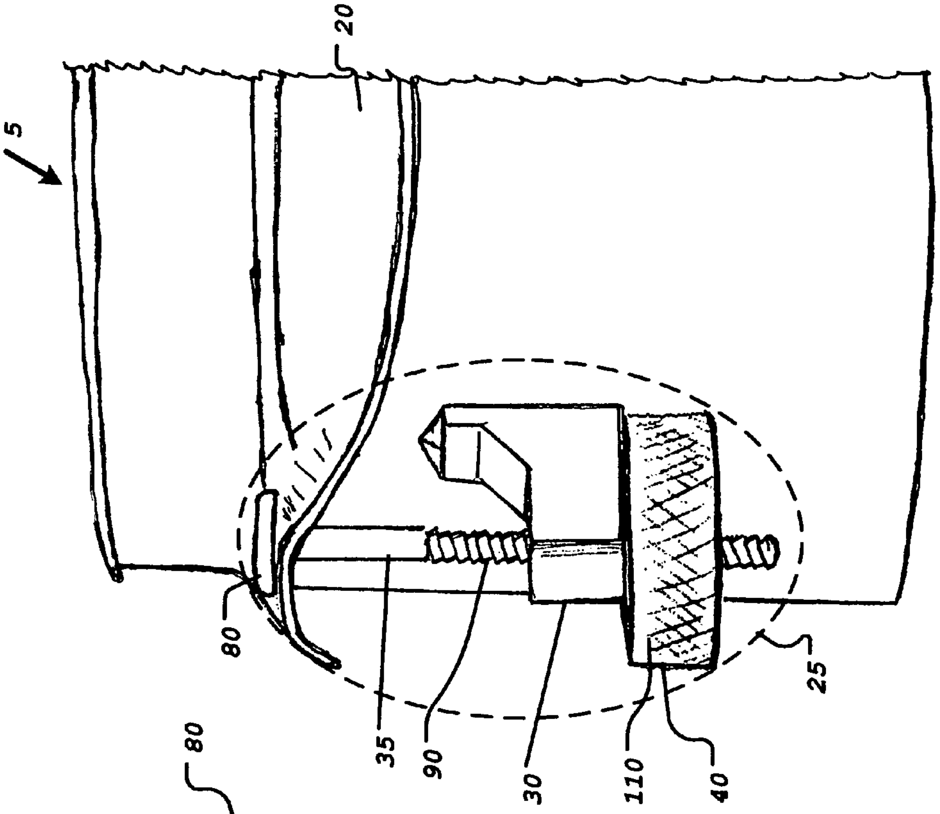
FIG. 5 is a perspective drawing of an embodiment of the keyless drum tuning device.

FIG. 5 is a perspective drawing of an embodiment of the keyless drum tuning device 25 as positioned on a musical drum 5. Referring to FIGS. 5 and 6*a*, the tensioning fastener 35 is passed through the locking feature 150 and then through the opening 55 of the lug bracket 30. The adjustment device 40 is placed on the tensioning fastener 35 and the adjustment device 40 is repositioned with respect to the tensioning fastener 35 to move the counter-hoop 20 to increase the tension of the membranous head 15 to tune the drum to raise or lower the tonal pitch of the musical drum 5.

The keyless drum tuning device 25 with the lug bracket 30 attached to the shell 10 and the tensioning fastener 35 attached to the counter-hoop 20 and the lug bracket 30 with the adjustment device 40 offers a very precise, one hand, stationary fine tuning of any musical drum with better resistance to de-tuning. There are no overtones or buzzing to interfere with microphone recording or live performance sound, since there are no inserts or springs to rattle or buzz when the musical drum 5 is hit. The keyless drum tuning device 25 further provides for speed of assembly or disassembly for changing the membranous head 15. The adjustment device 40 is quickly removed from the tensioning fastener 35 and the counter-hoop 20 to allow the removal of the counter-hoop 20 from the rim of the body shell 10. The membranous head 15 can then be removed and another replaced over the rim of the body shell 10. The counter-hoop 20 is then replaced and the tensioning fastener 35 is then placed through the locking feature 150 of the counter-hoop 20. The adjustment device 40 is threaded on the tensioning fastener 35. The adjustment device 40 on each of the keyless drum tuning devices 25 on the drum are then hand adjusted by the user turning the adjustment device 40 on the tensioning fastener 35 to tune the drum.

The keyless drum tuning device 25 permits in situ stationary tuning of the musical drum 5. The musical drum 5 remains in its operational position on a stand or mount during the tuning process. In musical drums with top and bottom heads, this is particularly convenient in that the top and bottom heads are tuned while in place. This prevents the natural resonance of the body shell 10 of the musical drum 5 from being muted while being held by hand during tuning. This is especially valuable for tuning the bottom membranous head 15 of snare drums where the snare wires should not be in contact with the head and creating "snare buzz" during the tuning process.

While this invention has been particularly shown and described with reference to the preferred embodiments thereof, it will be understood by those skilled in the art that various changes in form and details may be made without departing from the spirit and scope of the invention. For instance the lug bracket 30 is shown as being secured with a single fastener 57 to the body shell 10 in FIG. 1*b*. In other embodiments there may be multiple fasteners securing the lug bracket 30 to the body shell. The tensioning fastener 35 is shown with a locking element 85 that is a square neck of a carriage bolt. In other embodiment the locking element 85 may have any desirable shape for securing the tensioning fastener 35 to the counter-hoop 20.

The invention claimed is:

1. A keyless drum tuning device for tensioning a membranous head of a musical drum, the keyless drum tuning device comprising:

a lug bracket attached to a body shell of the musical drum, the lug bracket comprising:

a first surface and a second surface on opposing sides of the lug bracket, an opening between the first and second surface of the lug bracket, a third surface connected to the first and second surfaces and placed for attaching the lug bracket to the body shell;

a tensioning fastener placed in the opening between the first and second surface of the lug bracket and secured to a counter hoop of the musical drum; and an adjustment device connected to the tensioning fastener and placed in contact with the lug bracket to adjust the tensioning fastener to cause the counter hoop to stretch the membranous head to tune the musical drum.

2. The keyless drum tuning device of claim 1 wherein the lug bracket receives a securing fastener to attach the lug bracket to the body shell of the drum.

3. The keyless drum tuning device of claim 1 wherein the securing fastener has a washer that is sufficiently sound absorbent to acoustically cushion the drum shell from the lug bracket.

4. The keyless drum tuning device of claim 1 wherein the tensioning fastener has a threaded region and the adjustment device has a threaded opening through which the tensioning fastener passes with threads of the threaded region mating with threads of the threaded opening for adjusting the tension in the membranous head by forcing the counter-hoop to move in a direction toward the lug bracket.

5. The keyless drum tuning device of claim 3 wherein the threaded region is a machine thread type of from approximately 20 threads per inch to approximately 40 threads per inch.

6. The keyless drum tuning device of claim 3 wherein the tensioning fastener is a carriage bolt.

7. The keyless drum tuning device of claim 3 wherein the tensioning fastener is a metal rod wherein the metal rod and the adjustment device are brass, stainless steel, chromium plated steel or other metal.

8. The keyless drum tuning device of claim 3 wherein the tensioning fastener is a cylindrically shaped rod where the cylindrically shaped rod and the adjustment mechanism are a fiber reinforced plastic where the fiber is carbon fiber.

9. The keyless drum tuning device of claim 1 wherein the tensioning fastener has a locking element that secures the tensioning fastener to the counter-hoop to prevent the tensioning fastener from rotating when secured to the counter-hoop.

10. The keyless drum tuning device of claim 9 wherein the counter hoop has a locking feature for receiving the tensioning fastener such that the locking feature mates with the locking element to prevent the tensioning fastener from rotating.

11. The keyless drum tuning device of claim 10 wherein the tensioning fastener has a head of sufficient size to prevent the tensioning fastener from passing through the locking feature of the counter-hoop.

12. The keyless drum tuning device of claim 1 wherein the adjustment device is a cylindrical knob having a knurled pattern to increase friction for ease of turning of the adjustment device.

13. The keyless drum tuning device of claim 12 wherein the knurled pattern is grooves or ridges.

14. The keyless drum tuning device of claim 1 wherein the adjustment mechanism has multiple detents that are seated into indentations of a bottom surface of the lug bracket to maintain the tension in the head of the musical drum to prevent the adjustment mechanism from being reversed and relaxing the tension in the membranous head of the musical drum.

15. A musical drum comprising:

a drum shell;

at least one vibratory membranous head in contact with the drum shell;

a tensioning counter hoop in contact with the at least one membranous head to secure the membranous head to the drum shell, wherein the tensioning counter-hoop fits over a bearing edge of the drum shell such that the tensioning counter-hoop forces the membranous head to stretch to tune the drum;

a plurality of keyless drum tuning devices connected between the tensioning counter-hoop and the drum shell to force the tensioning counter-hoop to adjust the tension of the membranous head wherein each of the plurality of keyless drum tuning devices comprises:

a lug bracket attached to a body shell of the musical drum, the lug bracket comprising:

a) a first surface and a second surface on opposing sides of the lug bracket, b) an opening between the first and second surface of the lug bracket, c) a third surface connected to the first and second surfaces and placed for attaching the lug bracket to the body shell;

a tensioning fastener placed in the opening between the first and second surface of the lug bracket and secured to a counter hoop of the musical drum; and an adjustment device connected to the tensioning fastener and placed in contact with the lug bracket to adjust the tensioning fastener to cause the counter hoop to stretch the membranous head to tune the musical drum.

16. The musical drum of claim 15 wherein the lug bracket receives a securing fastener to attach the lug bracket to the body shell of the drum.

17. The musical drum of claim 16 wherein the securing fastener has a washer that is sufficiently sound absorbent to acoustically cushion the drum shell from the lug bracket.

18. The musical drum of claim 15 wherein the tensioning fastener has a threaded region and the adjustment device has a threaded opening through which the tensioning fastener passes with threads of the threaded region mating with threads of the threaded opening for adjusting the tension in the membranous head by forcing the counter-hoop to move in a direction toward the lug bracket.

19. The musical drum of claim 18 wherein the threaded region is a machine thread type of from approximately 20 threads per inch to approximately 40 threads per inch.

20. The musical drum of claim 18 wherein the tensioning fastener is a carriage bolt.

21. The musical drum of claim 18 wherein the tensioning fastener is a metal rod wherein the metal rod and the adjustment device are brass, stainless steel, chromium plated steel or other metal.

22. The musical drum of claim 18 wherein the tensioning fastener is a cylindrically shaped rod where the cylindrically shaped rod and the adjustment mechanism are a fiber reinforced plastic where the fiber is carbon fiber.

23. The musical drum of claim 15 wherein the tensioning fastener has a locking element that secures the tensioning fastener to the counter-hoop to prevent the tensioning fastener from rotating when secured to the counter-hoop.

24. The musical drum of claim 23 wherein the counter hoop has a locking feature for receiving the tensioning fastener such that the locking feature mates with the locking element to prevent the tensioning fastener from rotating.

25. The musical drum of claim 24 wherein the tensioning fastener has a head of sufficient size to prevent the tensioning fastener from passing through the locking feature of the counter-hoop.

26. The musical drum of claim 15 wherein the adjustment device is a cylindrical knob having a knurled pattern to increase friction for ease of turning of the adjustment device.

27. The musical drum of claim 26 wherein the knurled pattern is grooves or ridges.

28. The musical drum of claim 15 wherein the adjustment mechanism has multiple detents that are seated into indentations of a bottom surface of the lug bracket to maintain the tension in the head of the musical drum to prevent the adjustment mechanism from being reversed and relaxing the tension in the membranous head of the musical drum.

* * * * *